United States Patent [19]

Brusasco

[11] 4,186,620
[45] Feb. 5, 1980

[54] SCREW-NUT SCREW TRANSMISSION COUPLING

[75] Inventor: Enzo Brusasco, Turin, Italy
[73] Assignee: Roltra S.p.A., Milan, Italy
[21] Appl. No.: 880,917
[22] Filed: Feb. 24, 1978
[30] Foreign Application Priority Data
Mar. 9, 1977 [IT] Italy ................................. 67516 A/77
[51] Int. Cl.² ............................................. F16H 1/18
[52] U.S. Cl. .................................. 74/424.8 R; 74/459
[58] Field of Search ................ 74/459, 424.8 R, 89.15
[56] References Cited
U.S. PATENT DOCUMENTS

| | | | |
|---|---|---|---|
| 2,724,284 | 11/1955 | Anderson et al. | 74/459 |
| 3,327,551 | 6/1967 | Prveter | 74/459 |
| 3,464,278 | 9/1969 | Parnell | 74/89.15 |
| 3,826,153 | 7/1974 | Sheppard | 74/459 |
| 4,074,585 | 2/1978 | Richard et al. | 74/459 |
| 4,074,587 | 2/1978 | Brusasco | 74/424.8 R |

*Primary Examiner*—C. J. Husar
*Assistant Examiner*—Conrad Berman
*Attorney, Agent, or Firm*—Ladas, Parry, Von Gehr, Goldsmith & Deschamps

[57] ABSTRACT

A screw-nut screw coupling comprises a tubular element provided with an internal helical groove and an elongate member, formed by a preloaded spring having an external helical groove machined thereon. The tubular element is coupled to the elongate member by means of a number of balls mounted for rolling along an helical path defined by said helical grooves and forming a portion of an endless path for said balls to roll therealong. The tubular element is formed by at least two co-axial tubular sleeves rigidly connected to one another, one of said sleeves being arranged outside the other and being provided with groove means defining a portion of said endless path.

7 Claims, 5 Drawing Figures

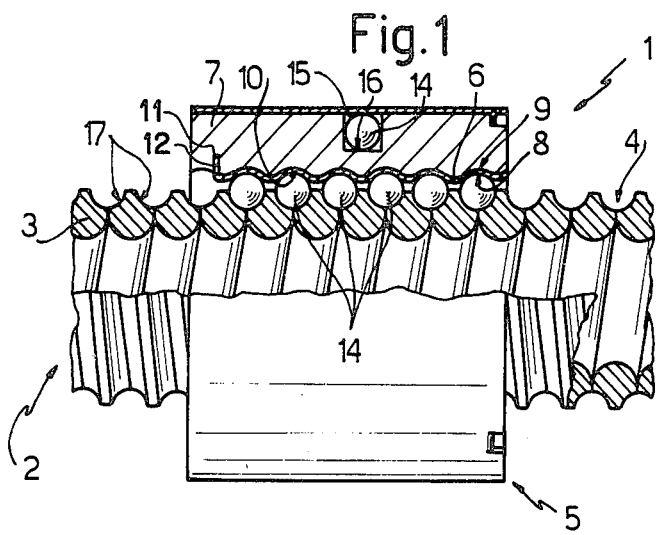
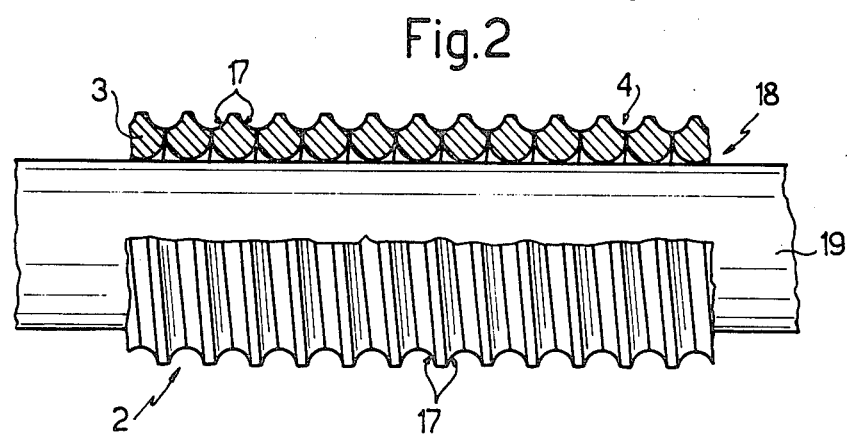
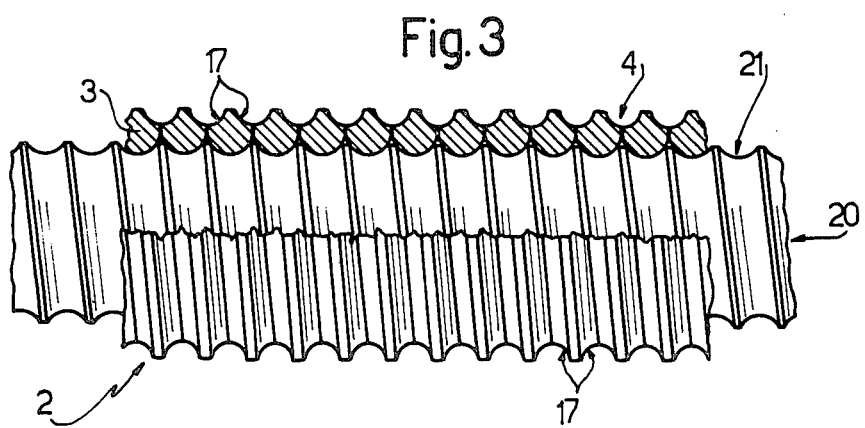

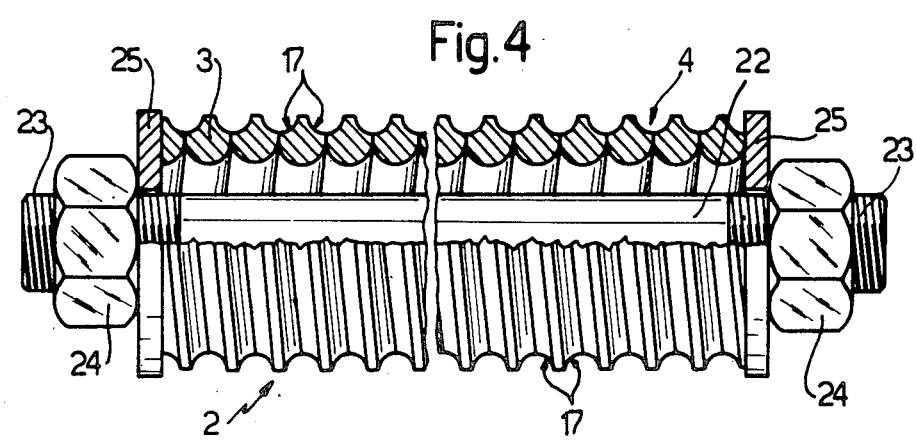
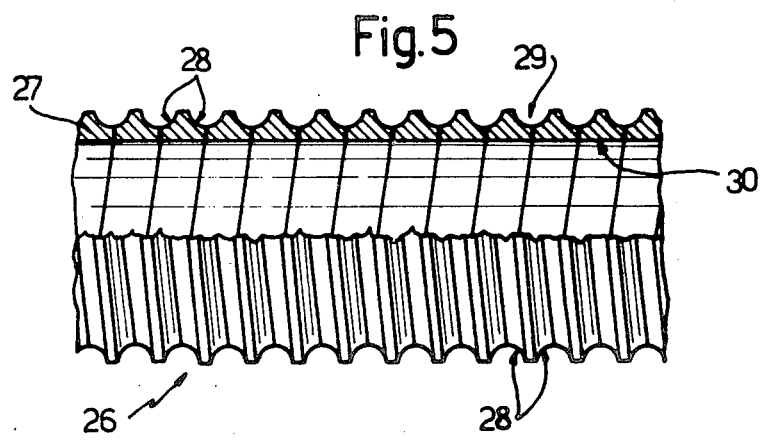

SCREW-NUT SCREW TRANSMISSION COUPLING

BACKGROUND OF THE INVENTION

This invention relates to a screw-nut screw coupling of the type comprising a first and second element coupled together in such a manner that rotary motion of one of them produces corresponding translatory motion of the other.

In particular, the present invention relates to a screw-nut screw coupling of the type comprising a tubular element with at least one internal helical groove of constant pitch. An elongate element extends with radial slack through said tubular element and comprises externally at least one helical groove of pitch substantially equal to the pitch of said internal groove and defines with this latter a first rolling path for a plurality of balls interposed between said elongate and tubular elements. Recirculation means defines at least one second rolling path for said balls which extends between two spaced points of said first path and in parallel thereto, to define with this latter an endless rolling path for said balls.

In known screw-nut screw couplings of the type heretofore described, the said tubular element generally consists of a single piece normally produced by mechanical chipforming machining starting from a block of special steel, on which one or more external ducts are added when machining is finished, each duct defining a recirculation path for said balls. Because of the relatively high costs of such a manufacturing process, the use of screw-nut screw couplings of the aforementioned type has been substantially limited to extremely sophisticated applications in which the need to obtain maximum operational precision and minimum friction outweighs any cost consideration.

SUMMARY OF THE INVENTION

The object of the present invention is to provide a screw-nut screw coupling of the aforementioned type, the structure of which allows its construction at relatively low cost, while preserving the precision and low friction characteristics of known couplings of the same type.

This object is attained by the present invention since it relates to a screw-nut screw transmission coupling, comprising an elongate member formed by a preloaded spring on which an external helical groove of uniform pitch has been machined, a plurality of ball bearings, and a tubular member through which said elongated member extends with radial slack. The tubular member comprises first and second tubular sleeves which are rigidly connected in coaxial arrangement with the first sleeve disposed within the second sleeve. The first sleeve is formed with an internal helical groove of pitch substantially equal to the pitch of said external helical groove, and internal helical groove cooperating with said external helical groove to define a first duct. The second sleeve is formed with a return duct which communicates with said first duct.

BRIEF DESCRIPTION OF THE DRAWINGS

The invention will be described by way of example with reference to the accompanying drawings, in which:

FIG. 1 is a partly sectional side view of a screw-nut screw coupling constructed in accordance with the present invention; and FIGS. 2, 3, 4 and 5 are partly sectional views of respective modifications of a detail of FIG. 1.

DETAILED DESCRIPTION OF THE INVENTION

FIG. 1 shows a screw-nut screw coupling indicated overall by 1, and comprising two members coupled together, the first of which, indicated by 2, is an elongate element constituted by a precompressed helical spring formed by winding a filiform element 3 into a helix, the adjacent turns of which define a helical groove 4 of substantially semi-cylindrical section, and the second of which, indicated by 5, is a tubular element through which the screw 2 extends with radial slack. The tubular element 5 comprises two coaxial sleeves 6 and 7 which are rigid with each other, with the former disposed in the latter. The sleeve 6 is preferably constituted of hardened steel plate shaped to define on its inner surface a helical groove 8 of substantially semi-cylindrical section and of pitch equal to the pitch of the groove 4. A helical protuberance 9 on the outer surface of the sleeve 6 corresponds with the groove 8, and engages with a corresponding helical groove 10 formed on the inner surface of the sleeve 7. This latter preferably consists of reinforced plastics or sintered steel, and at one end comprises a plurality of radial cavities 11, each of which houses internally an external radial appendix 12 of the sleeve 6. The appendices 12 are preferably constructed by shearing and bending, and are arranged to lock the sleeves 6 and 7 together both axially and angularly.

The helical grooves 4 and 8 are disposed facing each other and define a helical rolling path for a plurality of balls 14 disposed between the elements 2 and 5, and arranged to guarantee that these latter are coaxial and to transform the rotary motion of one of said two elements into translatory motion of the other element and vice versa, with a transmission ratio which is a function of the diameter of the balls 14.

Two distinct spaced-apart points on the helical path are connected together by a substantially U-shaped recirculation path 15 comprising a channel 16 formed on the outer surface of the sleeve 7 and extending in a plane forming a determined angle (not shown) with the axis of the sleeve 7. The channel 16 has a substantially square cross-section, and each of its ends communicates with a hole (not shown) provided through the sleeve 6 to enable the balls 14 to pass from the path to the path 15 and vice versa.

As shown in FIG. 1, the filiform element 3 has a substantially circular cross-section provided, in that half which faces the outside of the spring 2, with two equal and opposite lateral curved flutes 17 which each define one axial half of the helical groove 4.

In the embodiment shown in FIG. 1, the spring 2 has no inner support. In contrast, FIG. 2 shows an elongated element 18 which can be coupled to the element 5 and comprising, besides the spring 2, an inner support core constituted by a rigid cylindrical plastics or metal rod 19 disposed with its outer surface tangential to the inner surface of the turns of the spring 2.

In combination with the spring 2, the rod 19 constitutes a rigid screw, the axis of which may be straight or otherwise, according to requirements.

Should it be necessary to give the spring 2 a very high axial rigidity, the cylindrical rod 19 may be replaced, as shown in FIG. 3, by a rod 20 with an external helical cavity 21 arranged to receive the inner half of the filiform element 3. As an alternative, as shown in FIG. 4, the rod 19 may be replaced by a tie rod 22 which is not necessarily cylindrical and not necessarily disposed with its outer surface in contact with the turns of the spring 2, but which has its ends 23 threaded and emerging from the two ends of the spring 2. A nut 24 is mounted on each threaded end 23 and is arranged to cooperate with the relative end of the spring 2 by way of a washer 25. By tightening the nuts 24 relative to each other, it is possible to give the spring 2 any required axial preload and corresponding rigidity.

In each of the embodiments shown in FIGS. 1, 2, and 4, the spring 2 could be replaced by a spring 26 consisting of a filiform element 27 wound in a cylindrical helix and with a substantially parallelogram cross-section, in this particular case a substantially rectangular cross-section. After winding of the helix, the helix is machined to provide at those corners facing outwards from the spring 26 two equal and opposite recesses 28 which each define one axial half of a helical groove 29, the cross-section of which is similar to that of the groove 4. On the inside of the spring 26, the turns formed by the element 27 define a substantially cylindrical surface 30.

What I claim is:

1. A screw-nut screw transmission coupling, comprising an elongate preloaded spring formed from a filiform element wound as a cylindrical helix and machined so as to have a cross-sectional shape defining, between each pair of adjacent turns disposed in mutual contact, an external helical groove of uniform pitch equal to the pitch of the spring and of substantially semicylindrical cross-section, and the coupling further comprising a plurality of ball bearings, and a tubular member through which said elongated member extends with radial slack, said tubular member comprising first and second tubular sleeves which are rigidly connected in coaxial arrangement with the first sleeve disposed within the second sleeve, said first sleeve being formed with an internal helical groove of pitch substantially equal to the pitch of said external helical groove, said internal helical groove cooperating with said external helical groove to define a first duct, and said second sleeve being formed with a return duct which communicates with said first duct.

2. A coupling as claimed in claim 1, wherein said filiform element has a substantially circular cross-section provided laterally with two equal and opposite recesses in that half facing away from said spring.

3. A coupling as claimed in claim 1, wherein said filiform element has a substantially parallelogram cross-section provided with two equal and opposite recesses at those corners facing away from said spring.

4. A coupling as claimed in claim 3, wherein said spring is wound about a tie rod, the ends of which are threaded and emerge from the spring, tightening means being mounted on said threaded ends of said tie rod to apply a determined precompression load to said spring.

5. A coupling as claimed in claim 1, wherein said spring is wound about a rigid core.

6. A coupling as claimed in claim 5, wherein said core is constituted of rigid plastics material.

7. A coupling as claimed in claim 5, wherein said core is a metal core.

* * * * *